(12) United States Patent
Jakovlev et al.

(10) Patent No.: US 11,396,851 B2
(45) Date of Patent: Jul. 26, 2022

(54) METHOD FOR CARRYING OUT A LOAD POINT SHIFT OF AN INTERNAL COMBUSTION ENGINE UPON ACTIVATION OR DEACTIVATION OF AN ELECTRICALLY HEATED COMPONENT

(71) Applicant: Volkswagen Aktiengesellschaft, Wolfsburg (DE)

(72) Inventors: Sergej Jakovlev, Braunschweig (DE); Johannes Bunkus, Hoetensleben OT Barneberg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 21 days.

(21) Appl. No.: 17/033,045

(22) Filed: Sep. 25, 2020

(65) Prior Publication Data

US 2021/0087987 A1   Mar. 25, 2021

(30) Foreign Application Priority Data

Sep. 25, 2019   (DE) ..................... 10 2019 214 701.1

(51) Int. Cl.
*F02D 41/02*   (2006.01)
*B60R 16/03*   (2006.01)
(Continued)

(52) U.S. Cl.
CPC .......... *F02D 41/024* (2013.01); *B60R 16/033* (2013.01); *F01N 3/2013* (2013.01);
(Continued)

(58) Field of Classification Search
CPC .. F02D 41/023; F02D 41/024; F02D 41/2406; F02D 2200/0802; F02D 2200/50; B60R 16/033; F01N 3/2013; F01N 3/38; F01N 9/00; F01N 2240/16; F02B 63/042; B60W 2510/068; B60W 2510/30; B60W 2540/106; B60W 2050/0026; B60W 20/16; B60W 20/17; B60W 2710/248;
(Continued)

(56) References Cited

U.S. PATENT DOCUMENTS 5,904,902 A  *  5/1999  Matuoka ................... F01N 9/00
                                                          422/174
7,615,879 B2    11/2009  Przywecki
(Continued)

FOREIGN PATENT DOCUMENTS

DE    102005060129 A1    6/2007
DE    102008023394 A1    1/2009
(Continued)

*Primary Examiner* — Audrey B. Walter
*Assistant Examiner* — Dapinder Singh
(74) *Attorney, Agent, or Firm* — Muncy, Geissler, Olds & Lowe, P.C.

(57) ABSTRACT

A method for operating an internal combustion engine of a motor vehicle, whereby an electrically heated component of an exhaust aftertreatment system being supplied with electrical power via an electric machine driven by the internal combustion engine, a load point shift of the internal combustion engine being carried out by an activation or a deactivation of the component or by a temporary storage of the necessary electrical energy for operating the component in a battery.

7 Claims, 2 Drawing Sheets

(51) Int. Cl.
*F01N 3/20* (2006.01)
*F02B 63/02* (2006.01)
*F02D 41/24* (2006.01)
*B60R 16/033* (2006.01)
*F02B 63/04* (2006.01)

(52) U.S. Cl.
CPC .......... *F02B 63/042* (2013.01); *F02D 41/023* (2013.01); *F02D 41/2406* (2013.01); *F02D 2200/0802* (2013.01); *F02D 2200/50* (2013.01)

(58) Field of Classification Search
CPC ...... B60W 10/06; B60W 10/08; B60W 10/30; B60W 10/26; B60W 30/1882; B60W 30/182; B60W 40/09; B60Y 2200/92; B60Y 2300/182; Y02T 10/40; Y02T 10/62; Y02T 10/84

See application file for complete search history.

(56) References Cited

U.S. PATENT DOCUMENTS

| | | | |
|---|---|---|---|
| 8,209,970 B2 | 7/2012 | Gonze et al. | |
| 9,482,129 B2 | 11/2016 | Katsuta | |
| 10,654,468 B2 | 5/2020 | Huelsmann et al. | |
| 2003/0172643 A1* | 9/2003 | Suzuki ................. | B60L 50/16 60/284 |
| 2004/0006414 A1* | 1/2004 | Suzuki ................. | B60W 20/00 701/22 |
| 2014/0290216 A1* | 10/2014 | Katsuta ................ | B60W 10/30 60/274 |
| 2019/0061736 A1 | 2/2019 | Wiesbeck et al. | |

FOREIGN PATENT DOCUMENTS

| | | |
|---|---|---|
| DE | 102009027641 A1 | 1/2011 |
| DE | 102012109731 A1 | 4/2013 |
| DE | 102016219038 A1 | 5/2017 |
| DE | 102016205468 A1 | 10/2017 |
| DE | 102016207037 A1 | 10/2017 |
| DE | 102016207039 A1 | 10/2017 |
| EP | 2716885 A1 | 4/2014 |
| JP | 2009035226 A | 2/2009 |

* cited by examiner

METHOD FOR CARRYING OUT A LOAD POINT SHIFT OF AN INTERNAL COMBUSTION ENGINE UPON ACTIVATION OR DEACTIVATION OF AN ELECTRICALLY HEATED COMPONENT

This nonprovisional application claims priority under 35 U.S.C. § 119(a) to German Patent Application No. 10 2019 214 701.1, which was filed in Germany on Sep. 25, 2019, and which is herein incorporated by reference.

BACKGROUND OF THE INVENTION

Field of the Invention

The present invention relates to a method for carrying out a load point shift of an internal combustion engine upon an activation or deactivation of an electrically heated component (EHC).

Description of the Background Art

Further reduced pollutant limit values will require a highly-efficient exhaust aftertreatment system (EATS) in the future. To quickly achieve a sufficiently high efficiency of the individual components, they must preferably quickly exceed their light-off temperature. One possibility is to actively heat the components with the aid of an electrically heated catalyst, a so-called EHC. For the purpose of a rapid heating, the heating power of the EHC should be greater than or equal to 2 kW, greater than or equal to 3 kW being better, preferably greater than or equal to 4 KW.

The electrical power is generally provided via an electric machine, e.g. via a belt-starter generator. The load point of the internal combustion engine is shifted thereby in the direction of a higher load. This is advantageous because a higher load point of the internal combustion engine results in higher exhaust gas temperatures and thus a faster heating of the exhaust aftertreatment system. The higher load generally results in a louder noise of the internal combustion engine, which may possibly be negatively perceived by the driver. The noise level may thus be felt to be particularly negative because the heating demand is not directly influenced or initiated by an action of the driver. EHC systems, in which the power may be only discontinuously set, are particularly critical. This occurs, among other things, when the EHC control unit is designed as a PWM/transistor switch. In the case of a discontinuous, abrupt load change, the noise of the internal combustion engine changes correspondingly abruptly. Continuously adjustable systems having a DC/DC converter also exist.

A method and a device are known from DE 10 2016 207 037 A1 (which corresponds to U.S. Ser. No. 10/654,468) and DE 10 2016 207 039 A1 (which corresponds to US 2019/0061736) for operating a hybrid vehicle, which includes an electric energy store and comprises an electric motor with a combustion unit. Defined events with masking potential, coordinated for increasing the acoustic limits for raising the load point or varying the load point, are used. A special operating strategy for an combustion unit is initiated, with the aid of which an increase of the charge state of an energy store is achievable if predefined acoustic conditions are met. The special operating strategy has a power-increasing effect, due to a load point adjustment up to variably predefined acoustic limits, which are defined as a function of the ascertained masking potential of certain acoustic events. A device for carrying out the method is proposed, which raises the acoustic limits for controlling the load point of the combustion unit at least to the level that is presently permissible, due to the masking of at least one acoustically relevant event. After commissioning a hybrid vehicle of this type, a check is made of which acoustically relevant even is currently present in each case. To coordinate the masking potential currently present in each case, the maximum of all masking potentials is ascertained in the form of a maximum sound pressure spectrum. The total sound pressure spectrum formed in this way is compared with a load-dependent sound pressure spectrum of the combustion unit, which is also stored in the control unit. The load point, whose sound pressure spectrum is below the coordinated total sound pressure spectrum in each case or is adequately masked thereby, is subsequently selected for the combustion unit. The total sound pressure spectrum is a variably predefinable acoustic limit. A load point raise may be predefined by an absolute load value as a function of the acoustically relevant masking events present in each case or as the difference from a base load value, which may also be predefined by a basic sound spectrum. A basic sound spectrum of this type may be ascertained empirically and stored in the control unit. The basic sound spectrum may be a higher engine sound accepted as the maximum if no additional masking events are present, compared to a basic state, e.g. due to speed-depending wind noise or road noise on a smooth roadway, which is always present. The basic acoustic threshold is dependent on the driving state, e.g. on the desired driving torque of the driver and on the speed. Acoustically relevant events are, in particular, events due to vehicle-internal sources of influence whose characteristic spectra are known, or whose occurrence may be controlled by vehicle-internal systems, e.g. a fan or air-conditioning unit, open windows, an open sunroof or the vehicle speed. Vehicle-external sources of influence whose occurrence is detectable by sensors, such as rain, road surfacing or travel through a tunnel, are also taken into account as events. User-induced sources of influence, in particular by operating audio systems, are furthermore taken into account. Moreover, unknown sources of influence, which are detected via at least one microphone, may be taken into account as events. The acoustic limits may be raised by the masking without sacrificing comfort.

A hybrid cold start strategy, which uses an electrically heated catalyst, is known from DE 10 2008 023 394 A1 (which corresponds to U.S. Pat. No. 8,209,970). The exhaust gas catalytic converter is assigned to a heating element, for example an electrically heated catalyst, which supplies additional heat to the exhaust gas catalytic converter. The additional heating provides for a reduced time up to the light-off of the exhaust gas catalytic converter. An internal combustion engine control module may evaluate data, including the ambient air temperature, the internal combustion engine coolant temperature, the exhaust gas flow and the power supplied to the electrically heated condenser for the purpose of estimating the time at which the electrically heated condenser is to be switched on after the internal combustion engine startup. The internal combustion engine control module may also take into account other information, including fuel/air ratios and ignition delay data, for the purpose of estimating the temperature of the catalyst in the exhaust gas condenser.

SUMMARY OF THE INVENTION

It is therefore an object of the present invention to provide a method according to the invention, in particular in such a way that the load point shift is not perceived by the driver as bothersome.

The method is used to operate an internal combustion engine of a motor vehicle, an electrically heated component, in particular an EHC, of an exhaust aftertreatment system being supplied with electrical power via an electric machine driven by the internal combustion engine, for example a belt-starter generator. A load point shift of the internal combustion engine is carried out upon the activation or deactivation of the component or at the start of the intermediate storage of the necessary electrical energy for operating the component in a battery. According to the invention, the load point shift is carried out at one of the following points in time or in the presence of one of the following conditions:

during a gear change, upon engaging a new gear;
during a change in the driving mode, the vehicle being driven by the internal combustion engine in the one driving mode, the internal combustion engine being driven by the kinetic energy of the motor vehicle with the gear engaged in the other driving mode, the so-called overrun mode;
by using characteristic map ranges having similar acoustics before and after the load point shift;
when the gradient of the gas pedal changes;
upon a change in the driving program;
upon an activation or deactivation of consumers by the driver.

The load point shift, which influences the noise of the internal combustion engine, is carried out at one of the points in time when the driver expects an increase in the noise of the internal combustion engine or does not feel it to be bothersome.

Characteristic map ranges having similar acoustics may result in, for example, a sound pressure change of a few decibels as the maximum, for example less than 2 dB. A latent switching of this type preferably takes place as a function of temperature difference ΔT. The load point shift is initiated as a function of difference ΔT between the actual temperature and the setpoint temperature of the component or the exhaust gas mass flow, a low switching threshold being present for a high heating demand, and a high switching threshold being present for a low heating demand.

A load point shift is already carried out in a characteristic map range with a sound pressure change of up to 1.0 dB or 1.5 dB in the case of a first bigger difference ΔT, a load point shift being carried out in a characteristic map range with a sound pressure change of less than 0.2 dB in the case of a second smaller difference ΔT.

If a change in the driving program occurs, e.g. by actuating the sport switch, or if a consumer is activated by the driver, for example an air conditioning unit or a heater, the driver perceives a change in the noise of the internal combustion engine as not bothersome.

A DOC, an SDPF or an SCR catalyst may be considered as components. The hidden switching may be carried out, in particular, upon the activation as well as upon the deactivation of the EHC. The temperatures are detected metrologically or ascertained analytically with the aid of an equivalent diagram.

For the purpose of a rapid heating, the heating power of the EHC is greater than 2 kW, or better greater than 3 kW, preferably greater than 4 KW.

The method may be particularly preferably used in EHC systems, in which the power is only discontinuously set. This occurs, among other things, when the EHC control unit is designed as a PWM/transistor switch.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
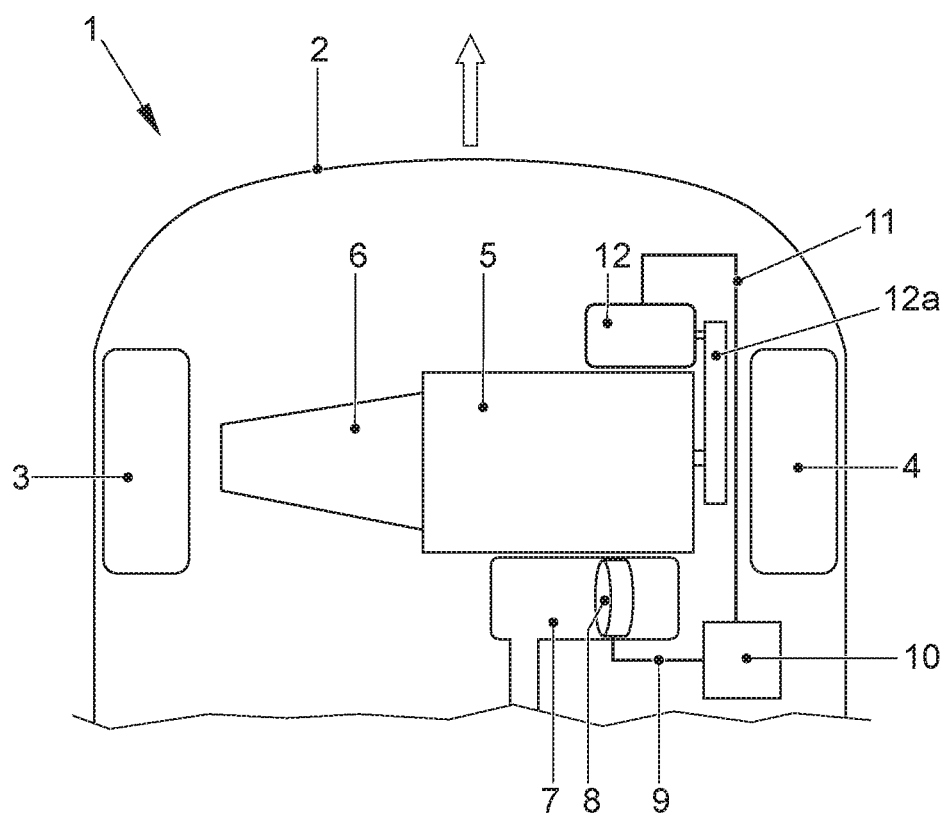
FIG. 1 shows a schematic representation and a front end of a motor vehicle.

FIG. 1 shows a highly schematic front end 1 of a motor vehicle, whose outer contour is indicated by a contour line. The direction of travel is indicated by an arrow. Two wheels, 3, 4 are also shown. The wheels are driven via an internal combustion engine (ICE) 5 and a transmission 6. An exhaust aftertreatment system (EATS) is present in exhaust tract 7. The exhaust aftertreatment system or EATS comprises an EHC 8, which is connected to an EHC control unit 10 via a cable 9. EHC control unit 10, in turn, is connected to a belt-starter generator 12 via a cable 11. Belt-starter generator 12 is driven via a belt 12a and may thus conduct current to EHC control unit 10 over cable 11.

Figure 2:
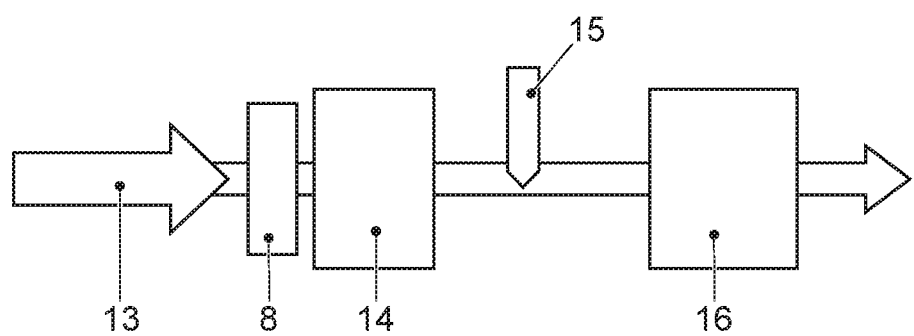
FIG. 2 shows a schematic representation of an exhaust aftertreatment system.

The exhaust aftertreatment system is illustrated schematically in FIG. 2. Exhaust gas 13 is first supplied from the internal combustion engine to EHC 8. The EHC position is illustrated here only as an example and may also be in another location. A diesel oxidation catalyst (DOC) 14 is disposed downstream from EHC 8. A temperature sensor 15 is disposed downstream from diesel oxidation catalyst (DOC) 14. The exhaust gas temperature of the exhaust gas emerging from diesel oxidation catalyst 14 may be measured with the aid of temperature sensor 15. A diesel particulate filter 16, in particular having an SCR coating (SDPF), is disposed downstream from temperature sensor 15.

In the method according to the invention, load point shifts, which influence the noise of internal combustion engine 5, are carried out at a point in time when the driver expects an increase in the noise of internal combustion engine 5 or does not feel it to be bothersome. The activation, but also the deactivation, of EHC 8 is preferably relevant. For example, the switching may take place during a gear change upon the engagement of the new gear.

The latent switching may also take place during a change in the driving mode, the vehicle being driven by internal combustion engine (ICE) 5 in the one driving mode, internal combustion engine (ICE) 5 being driven by the kinetic energy of the motor vehicle with the gear engaged in the other driving mode, the so-called overrun mode. The latent switching may take place during a change from the one driving mode (the vehicle is driven by the ICE) to the overrun mode or from the overrun mode to the one driving mode (the vehicle is driven by the ICE).

Figure 3:
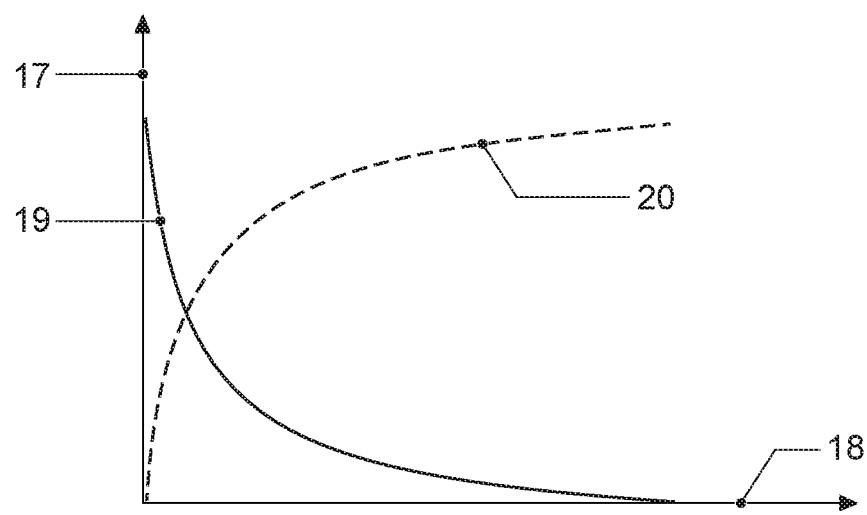
FIG. 3 shows a schematic representation of the connection between the temperature difference and the switching threshold.

The latent switching may furthermore take place by using characteristic map ranges having similar acoustics before and after the load point shift. The sound pressure change may be big in the case of a bigger necessary temperature change ΔT, for example 1.0 to 1.5 dB, or small in the case of a small necessary temperature change ΔT. This circumstance is shown in FIG. 3. Temperature difference ΔT, i.e. the difference between the actual temperature and the setpoint temperature, is plotted on horizontal axis 18. The switching threshold is plotted on vertical axis 17. Curve 20 now indicates that, if ΔT is big, a bigger sound pressure change is also permitted, while if delta t is small, only small sound pressure changes are desirable.

Moreover, the latent switching may take place when the gradient of the gas pedal changes. The switching threshold for a gas pedal gradient is also illustrated in FIG. 3. If ΔT is large, the switching threshold is low and is, for example, less than 50% per second. If ΔT is small, the switching threshold is high, i.e. the gas pedal gradient should be above 200% per second.

In addition, the latent switching may take place upon a change in the driving program which is possible, for example, when the driver activates a sport program.

The latent switching may also take place upon an activation or deactivation of consumers by the driver.

Moreover, a latent switching is possible by the activation of consumers by the driver. It is possible to temporarily store the necessary electrical energy for operating EHC 8 in a battery, the charging of the battery being switched in a latent manner via the electric machine, as described above.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for operating an internal combustion engine of a motor vehicle, the method comprising:
supplying an electrically heated component of an exhaust aftertreatment system with electrical power via an electric machine driven by the internal combustion engine; and
carrying out a load point shift of the internal combustion engine by an activation or a deactivation of the electrically heated component or by a temporary storage of the necessary electrical energy for operating the electrically heated component in a battery, the load point shift being carried out at any one of the following points in time or under any one of the following conditions:
during a gear change, upon engaging a new gear;
during a change in a driving mode, the vehicle being driven by the internal combustion engine in the driving mode, the internal combustion engine being driven by kinetic energy of the motor vehicle with the gear engaged in an overrun mode;
by using characteristic map ranges having similar acoustics before and after the load point shift;
when the gradient of the gas pedal changes;
upon a change in the driving program;
upon an activation or deactivation of consumers by the driver,
wherein a load point shift is carried out in a characteristic map range with a sound pressure change of up to 1.0 dB to 1.5 dB in the case of a first, bigger difference, a load point shift being carried out in a characteristic map range with a sound pressure change of less than 0.2 dB in the case of a second, smaller difference.

2. A method for operating an internal combustion engine of a motor vehicle, the method comprising:
supplying an electrically heated component of an exhaust aftertreatment system with electrical power via an electric machine driven by the internal combustion engine; and
carrying out a load point shift of the internal combustion engine by an activation or a deactivation of the electrically heated component or by a temporary storage of the necessary electrical energy for operating the electrically heated component in a battery, the load point shift being carried out at at least one of the following points in time or under one of the following conditions:
during a gear change, upon engaging a new gear;
during a change in a driving mode, the vehicle being driven by the internal combustion engine in the driving mode, the internal combustion engine being driven by kinetic energy of the motor vehicle with the gear engaged in an overrun mode;
by using characteristic map ranges having similar acoustics before and after the load point shift;
when the gradient of the gas pedal changes;
upon a change in the driving program; and/or
upon an activation or deactivation of consumers by the driver,
wherein the load point shift is initiated as a function of a difference between an actual temperature and a setpoint temperature of the electrically heated component or of the exhaust gas mass flow, a lower switching threshold being present in the case of a high heating demand, and a high switching threshold being present in the case of a low heating demand, and
wherein a load point shift is carried out in a characteristic map range with a sound pressure change of up to 1.0 dB to 1.5 dB in the case of a first, bigger difference, a load point shift being carried out in a characteristic map range with a sound pressure change of less than 0.2 dB in the case of a second, smaller difference.

3. A method for operating an internal combustion engine of a motor vehicle, the method comprising:
supplying an electrically heated component of an exhaust aftertreatment system with electrical power via an electric machine driven by the internal combustion engine; and
carrying out a load point shift of the internal combustion engine by an activation or a deactivation of the electrically heated component or by a temporary storage of the necessary electrical energy for operating the electrically heated component in a battery,
wherein the load point shift is initiated as a function of a difference between an actual temperature and a setpoint temperature of the electrically heated component or of the exhaust gas mass flow, a lower switching threshold being present in the case of a high heating demand, and a high switching threshold being present in the case of a low heating demand, and
wherein a load point shift is carried out in a characteristic map range with a sound pressure change of up to 1.0 dB to 1.5 dB in the case of a first, bigger difference, a load point shift being carried out in a characteristic map range with a sound pressure change of less than 0.2 dB in the case of a second, smaller difference.

4. A method for operating an internal combustion engine of a motor vehicle, the method comprising:

supplying an electrically heated component of an exhaust aftertreatment system with electrical power via an electric machine driven by the internal combustion engine; and carrying out a load point shift of the internal combustion engine by an activation or a deactivation of the electrically heated component or by a temporary storage of the necessary electrical energy for operating the electrically heated component in a battery, wherein a load point shift is carried out in a characteristic map range with a sound pressure change of up to 1.0 dB to 1.5 dB in the case of a first, bigger difference, a load point shift being carried out in a characteristic map range with a sound pressure change of less than 0.2 dB in the case of a second, smaller difference.

5. The method according to claim 4, wherein the load point shift is carried out at a point time when a driver expects an increase in a noise of the internal combustion engine.

6. The method according to claim 4, wherein the method is conducted in an electrically heated catalyst system in which the electric power is only discontinuously set.

7. A method for operating an internal combustion engine of a motor vehicle, the method comprising:

supplying an electrically heated component of an exhaust aftertreatment system With electrical power via an electric machine driven by the internal combustion engine; and carrying out a load point shift of the internal combustion engine by an activation or a deactivation of the electrically heated component or by a temporary storage of the necessary electrical energy for operating the electrically heated component in a battery, the load point shift being carried out at each of the following points in time or under each of the following conditions:

during a gear change, upon engaging a new gear;

during a change in a driving mode, the vehicle being driven by the internal combustion engine in the driving mode, the internal combustion engine being driven by kinetic energy of the motor vehicle with the gear engaged in an overrun mode;

by using characteristic map ranges having similar acoustics before and after the load point shift;

when the gradient of the gas pedal changes;

upon a change in the driving program;

upon an activation or deactivation of consumers by the driver.

* * * * *